United States Patent
Yang et al.

(10) Patent No.: US 10,397,817 B2
(45) Date of Patent: Aug. 27, 2019

(54) METHOD FOR PERFORMING MEASUREMENT AND USER APPARATUS

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Byounghoon Kim, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 164 days.

(21) Appl. No.: 15/127,368

(22) PCT Filed: Mar. 2, 2015

(86) PCT No.: PCT/KR2015/001995
§ 371 (c)(1),
(2) Date: Sep. 19, 2016

(87) PCT Pub. No.: WO2015/147451
PCT Pub. Date: Oct. 1, 2015

(65) Prior Publication Data
US 2018/0184313 A1    Jun. 28, 2018

Related U.S. Application Data

(60) Provisional application No. 61/969,839, filed on Mar. 25, 2014.

(51) Int. Cl.
*H04B 17/318* (2015.01)
*H04W 52/02* (2009.01)
(Continued)

(52) U.S. Cl.
CPC .......... *H04W 24/10* (2013.01); *H04B 17/318* (2015.01); *H04L 5/005* (2013.01);
(Continued)

(58) Field of Classification Search
CPC ............... H04W 24/10; H04W 72/044; H04W 52/0216; H04L 5/0035; H04B 1/123; H04B 17/318
See application file for complete search history.

(56) References Cited

U.S. PATENT DOCUMENTS

2011/0310830 A1* 12/2011 Wu ................... H04W 72/1289
370/329
2012/0113847 A1*  5/2012 Narasimha .......... H04L 41/0869
370/252
(Continued)

FOREIGN PATENT DOCUMENTS

WO    2012144842 A2    10/2012
WO    2013036084 A2     3/2013

OTHER PUBLICATIONS

3rd Generation Partnership Project, "Technical Specification Group Radio Access Network; Evolved Universal Terrestrial Radio Access (E-UTRA); Physical layer; Measurements (Release 11)", 3GPP TS 36.214 V11.1.0, Dec. 2012, 14 pages.

*Primary Examiner* — Omer S Mian
(74) *Attorney, Agent, or Firm* — Lee, Hong, Degerman, Kang & Waimey

(57) ABSTRACT

One disclosure of the present specification provides a method for performing measurement. The method for performing measurement may comprise the steps of: receiving, from a serving cell, pattern information on a subframe wherein power backoff is performed; on the basis of the pattern information, performing measurements independently in a subframe wherein power backoff is performed (Continued)

and in a subframe wherein power backoff is not performed; and reporting results of the measurements to the serving cell.

10 Claims, 11 Drawing Sheets

(51) Int. Cl.
*H04W 72/04* (2009.01)
*H04W 24/10* (2009.01)
*H04L 5/00* (2006.01)
*H04W 88/02* (2009.01)

(52) U.S. Cl.
CPC ..... *H04W 52/0216* (2013.01); *H04W 72/044* (2013.01); *H04W 88/02* (2013.01); *Y02D 70/124* (2018.01); *Y02D 70/126* (2018.01); *Y02D 70/1242* (2018.01); *Y02D 70/1262* (2018.01); *Y02D 70/1264* (2018.01); *Y02D 70/23* (2018.01)

(56) References Cited

U.S. PATENT DOCUMENTS

| | | | |
|---|---|---|---|
| 2012/0264441 A1 | 10/2012 | Chandrasekhar et al. | |
| 2013/0021929 A1* | 1/2013 | Kim | H04B 7/024 370/252 |
| 2013/0079048 A1* | 3/2013 | Cai | H04W 48/16 455/517 |
| 2013/0229940 A1 | 9/2013 | Baker et al. | |
| 2014/0128115 A1* | 5/2014 | Siomina | H04L 1/0015 455/501 |
| 2014/0204861 A1* | 7/2014 | Tie | H04W 52/24 370/329 |
| 2015/0049703 A1* | 2/2015 | Nobukiyo | H04L 5/0057 370/329 |
| 2015/0126237 A1* | 5/2015 | Nagata | H04W 52/54 455/522 |

* cited by examiner

METHOD FOR PERFORMING MEASUREMENT AND USER APPARATUS

CROSS-REFERENCE TO RELATED APPLICATIONS

This application is the National Stage filing under 35 U.S.C. 371 of International Application No. PCT/KR2015/001995, filed on Mar. 2, 2015, which claims the benefit of U.S. Provisional Application No. 61/969,839, filed on Mar. 25, 2014, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, in a next-generation mobile communication system, it is expected that a small cell having a small cell coverage radius is added within a coverage of a macro cell.

Further, in a next-generation mobile communication system, high-order modulation, for example, 256 quadrature amplitude modulation (QAM), may be improved to be used for a small cell.

However, 256 QAM is possible only in a small cell with low transmission power but is currently doubtful for a base station having transmit power greater than a small-cell base station due to different reasons.

To solve such a problem, a base station conducts power backoff to perform downlink transmission with reduced transmit power.

However, power backoff has a negative impact on measurement of a terminal.

SUMMARY OF THE INVENTION

Accordingly, an object of the present invention is to solve the above-mentioned problems.

To achieve the foregoing object, one disclosure of the present specification provides a method for performing measurement. The method may include: receiving, from a serving cell, pattern information on a subframe on which power backoff is performed; independently performing measurements on a subframe on which power backoff is performed and on a subframe on which power backoff is not performed on the basis of the pattern information; and reporting results of the measurements to the serving cell.

To achieve the foregoing object, one disclosure of the present specification also provides a user equipment (UE) for performing measurement. The UE may include: a radio frequency (RF) unit to receive, from a serving cell, pattern information on a subframe on which power backoff is performed; and a processor to independently perform measurements on a subframe on which power backoff is performed and on a subframe on which power backoff is not performed on the basis of the pattern information, and to report results of the measurements to the serving cell through the RF unit.

The pattern information may include pattern information on a subframe on which power backoff is performed by the serving cell and pattern information on a subframe on which power backoff is performed by a neighboring cell.

The results of the measurements reported to the serving cell may include a measured result on the subframe in which power backoff is performed and a measured result on the subframe in which power backoff is not performed.

When information on the power backoff is received from the serving cell, a measured result on the subframe in which power backoff is performed may be compensated for according to a compensation value based on the received information on the power backoff.

The results of the measurements reported to the serving cell may include an average measured result of the compensated measured result and a measured result on the subframe in which power backoff is not performed.

The pattern information may be formed of 40 bits, and each bit may indicate whether power backoff is performed for a corresponding subframe.

According to the disclosure of the present invention, the foregoing problem of the conventional technology is solved.

DESCRIPTION OF EXEMPLARY EMBODIMENTS

Figure 1:
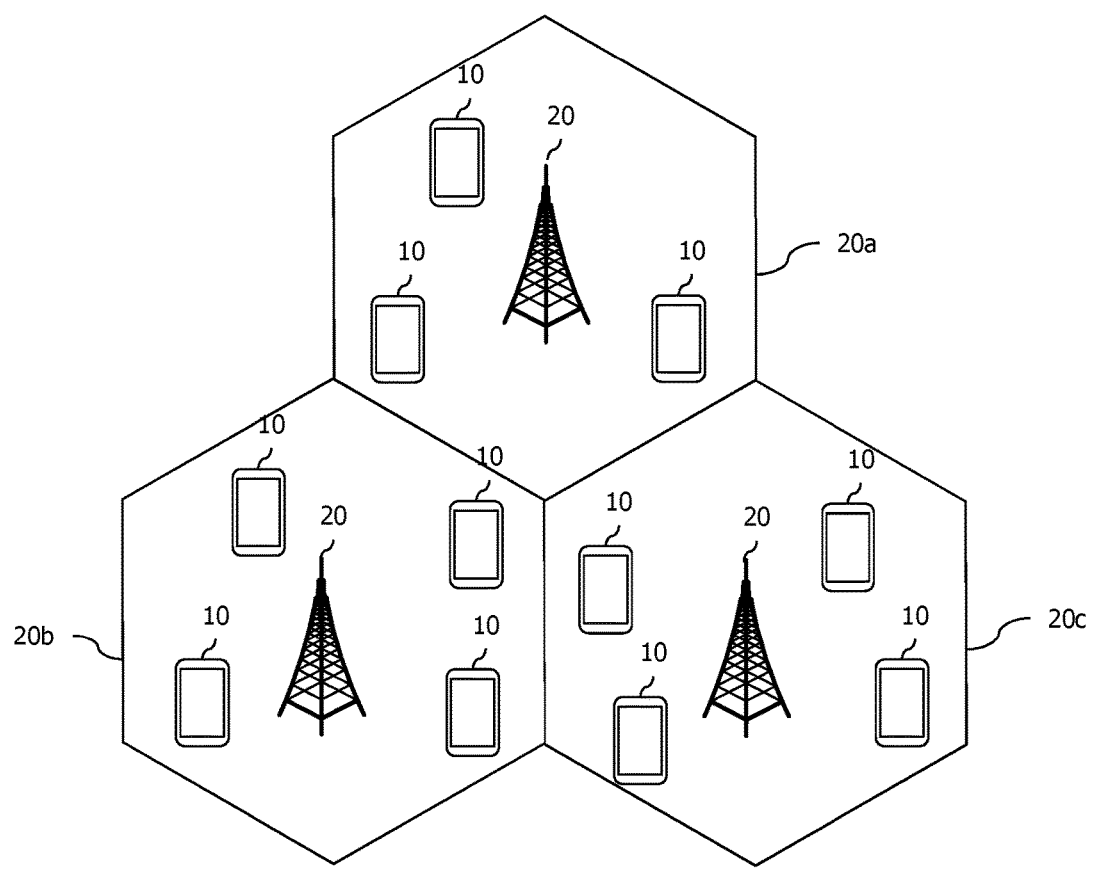
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Hereinafter, the LTE system will be described in detail.

Figure 2:
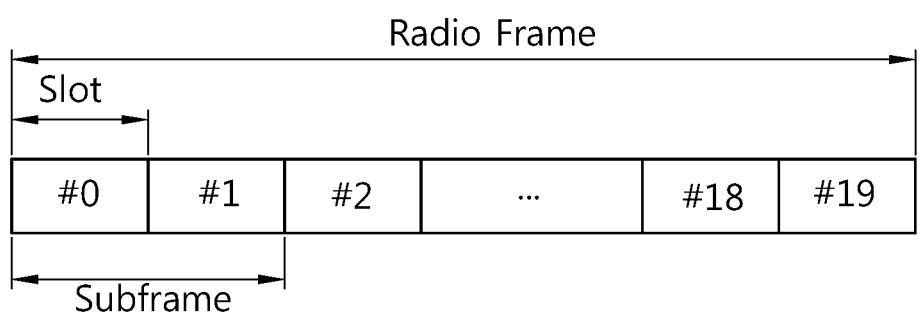
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
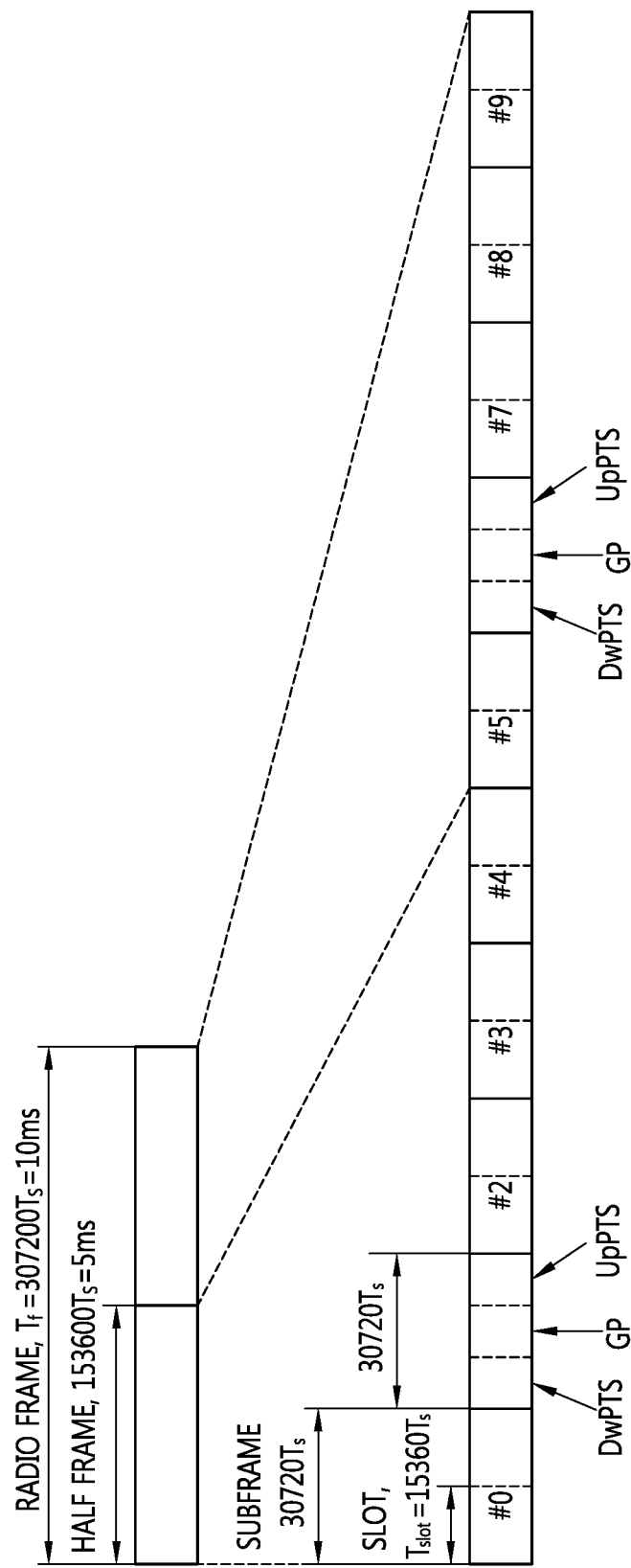
FIG. 3 illustrates a structure of a downlink radio frame according to TDD in the 3GPP LTE.

FIG. 3 illustrates the architecture of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| | Normal CP in downlink | | | Extended CP in downlink | | |
|---|---|---|---|---|---|---|
| | | UpPTS | | | UpPTS | |
| Special subframe configuration | DwPTS | Normal CP in uplink | Extended CP in uplink | DwPTS | Normal CP in uplink | Extended CP in uplink |
| 0 | 6592*Ts  | 2192*Ts | 2560*Ts | 7680*Ts  | 2192*Ts | 2560*Ts |
| 1 | 19760*Ts |         |         | 20480*Ts |         |         |
| 2 | 21952*Ts |         |         | 23040*Ts |         |         |
| 3 | 24144*Ts |         |         | 25600*Ts |         |         |
| 4 | 26336*Ts |         |         | 7680*Ts  | 4384*Ts | 5120*ts |
| 5 | 6592*Ts  | 4384*Ts | 5120*ts | 20480*Ts |         |         |
| 6 | 19760*Ts |         |         | 23040*Ts |         |         |
| 7 | 21952*Ts |         |         | —        |         |         |
| 8 | 24144*Ts |         |         | —        |         |         |

Figure 4:
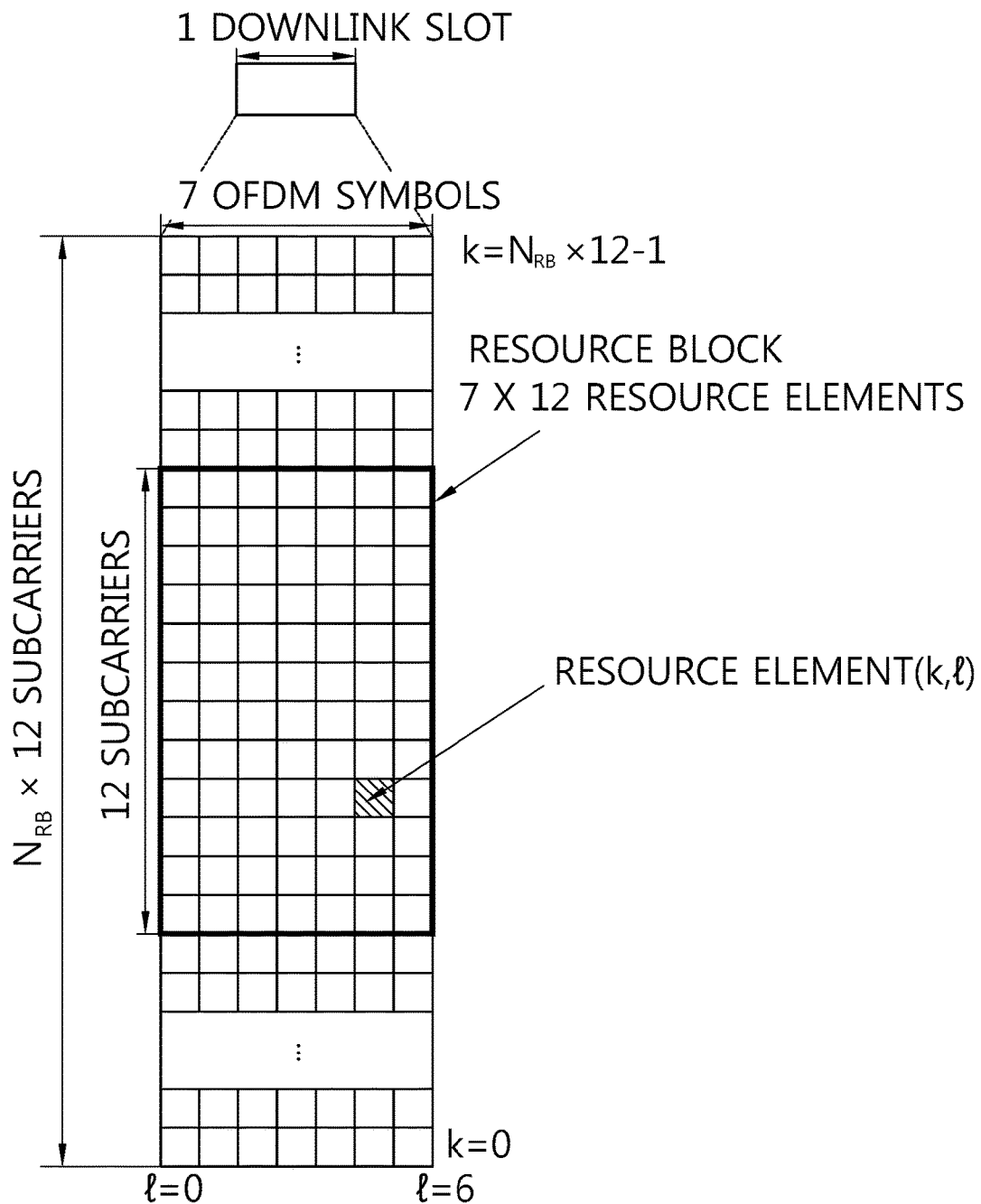
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
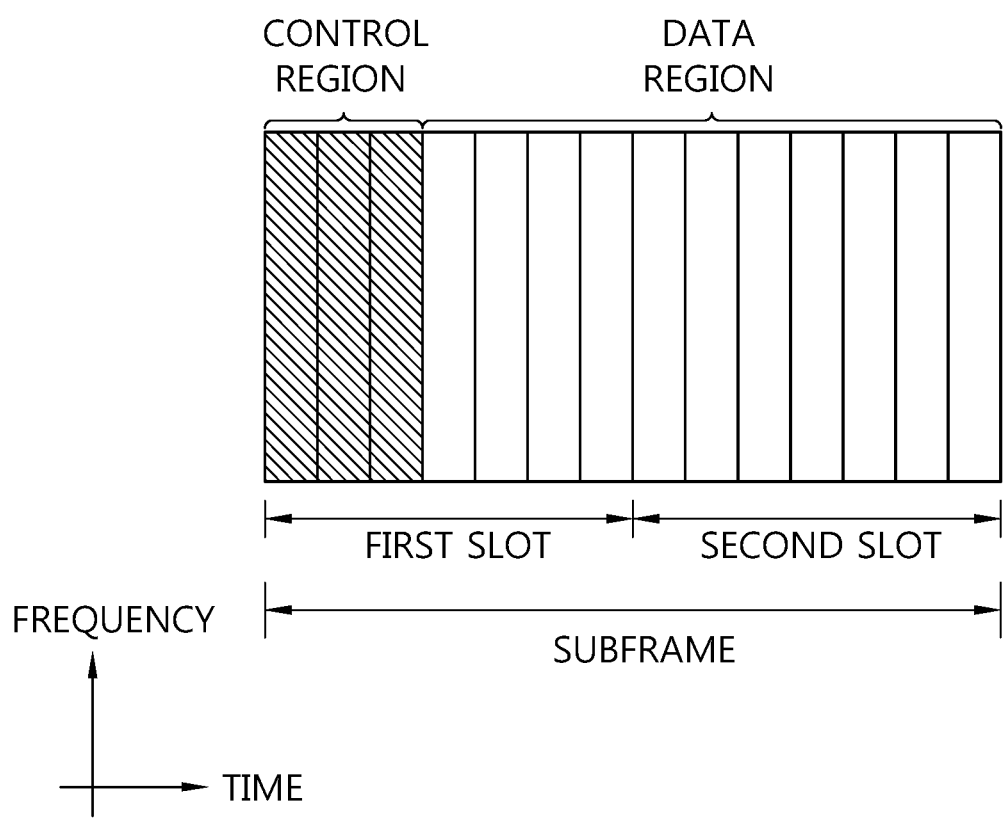
FIG. 5 illustrates a structure of a downlink subframe.

FIG. 5 illustrates the architecture of a downlink sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 6:
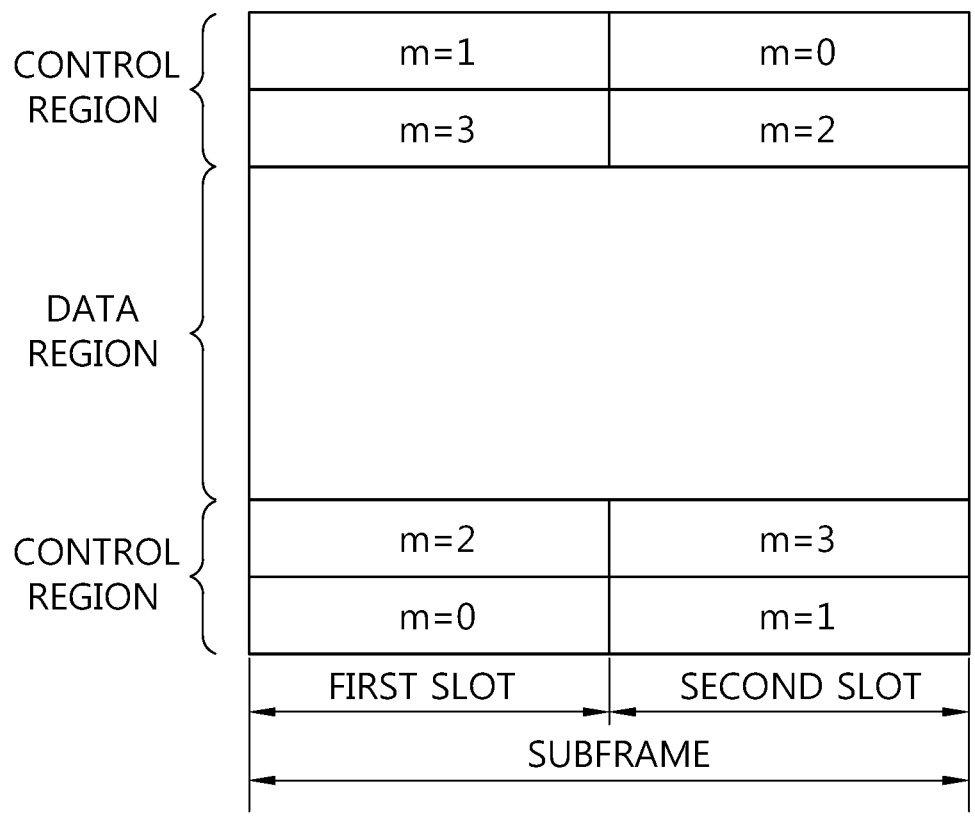
FIG. 6. illustrates a structure of an uplink subframe in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

Figure 7:
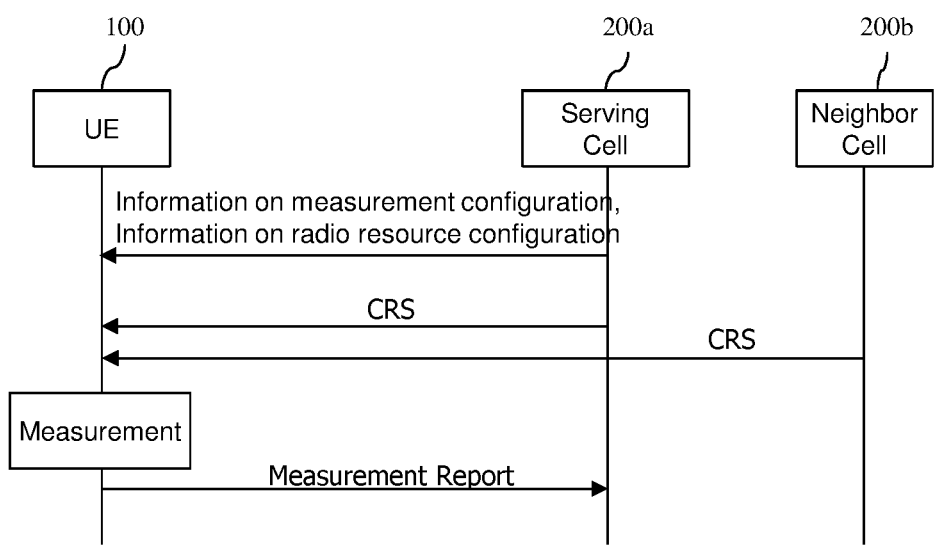
FIG. 7 illustrates a measurement and a measurement report.

FIG. 7 illustrates a measurement and a measurement report.

In wireless communication systems, it is indispensable to support mobility of the UE 100. Accordingly, the UE 100 continuously measures quality for serving cell that currently provides service and quality for a neighbor cell. The UE 100 reports the measurement result to a network on an appropriate time, and the network provides an optimal mobility to the UE through handover, and so on. Commonly, the measurement of such an object is called a radio resource management (RRM) measurement.

Figure 8:
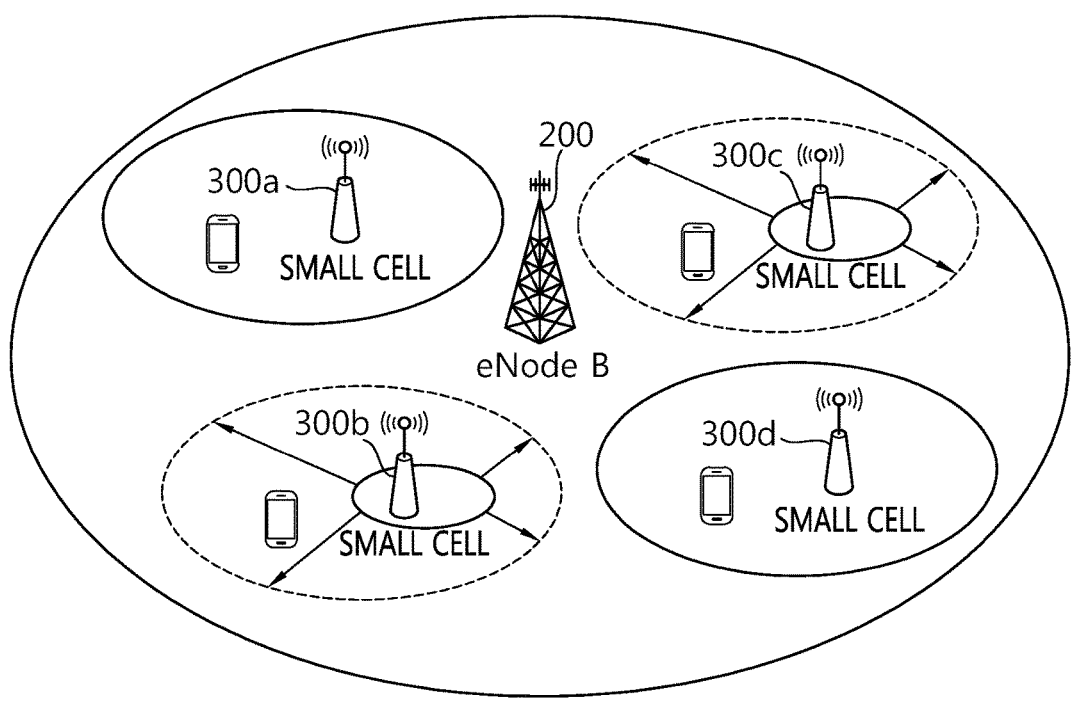
FIG. 8 illustrates a heterogeneous network environment in which a macro cell and a small cell coexist and which is possibly used in a next-generation wireless communication system.

As we can know with reference to FIG. 8, if each of the serving cell 200a and the neighbor cell 200b transmit a cell-specific reference signal (CRS) to the UE 100, the UE 100 performs measurement through the CRS, and transmits the measurement result to the serving cell 200a.

In this time, the UE 100 may perform the measurement in the following three methods.

1) RSRP (reference signal received power): This represents an average reception power of all REs that carry the CRS which is transmitted through the whole bands. In this time, instead of the CRS, an average reception power of all REs that carry the CSI RS may also be measured.

2) RSSI (received signal strength indicator): This represents a reception power which is measured through the whole bands. The RSSI includes all of signal, interference and thermal noise.

3) RSRQ (reference symbol received quality): This represents a CQI, and may be determined as the RSRP/RSSI according to a measured bandwidth or a subband. That is, the RSRQ signifies a signal-to-noise interference ratio (SINR). Since the RSRP is unable to provide a sufficient mobility, in handover or cell reselection procedure, the RSRQ may be used instead of the RSRP.

The RSRQ may be obtained by RSSI/RSSP.

Meanwhile, the UE 100 receives a measurement configuration information element (IE) from the serving cell 100a for the measurement. The message that includes the measurement configuration information element (IE) is called a measurement configuration message. Here, the measurement configuration information element (IE) may be received through a RRC connection reconfiguration message. If the measurement result satisfies a report condition in the measurement configuration information, the UE reports the measurement result to a base station. The message that includes the measurement result is called a measurement report message.

The measurement configuration IE may include measurement object information. The measurement object information is information of an object that is going to perform a measurement by the UE. The measurement object includes at least one of an intra-frequency measurement object which is an object of intra-cell measurement, an inter-frequency measurement object which is an object of inter-cell measurement and an inter-RAT measurement object which is an object of inter-RAT measurement. For example, the intra-cell measurement object indicates a neighbor cell that has a frequency band which is identical to that of a serving cell, the inter-cell measurement object indicates a neighbor cell that has a frequency band which is different from that of a serving cell, and the inter-RAT measurement object indicates a neighbor cell of a RAT which is different from that of a serving cell.

In particular, the measurement configuration IE includes an information element (IE) as shown in the following table

TABLE 3

MeasConfig ::=
   Measurement objects
      measObjectToRemoveList
      measObjectToAddModList The measObjectToRemoveList indicating a list of measObject to be removed and measObjectToAddModList indicating a list to be newly added or modified are included in the measurement objects IE.

MeasObjectCDMA2000, MeasObjectEUTRA, MeasObjectGERAN, etc. are included in the measObject according to a communication technology.

Meanwhile, the MeasObjectEUTRA IE includes information applied for the purpose of an intra-frequency or inter-frequency for E-UTRA cell measurement. The MeasObjectEUTRA IE is as shown in the following table.

TABLE 4

1) MeasObjectEUTRA
   neighCellConfig
      measSubframePatternConfigNeigh-r10
2) MeasSubframePatternConfigNeigh-r10
   measSubframePatternNeigh-r10
   measSubframeCellList-r10

The MeasObjectEUTRA is more specifically described as follows.

TABLE 5

Description of MeasObjectEUTRA field carrierFreq identifies an E-UTRA carrier frequency effective in the configuration.
neighCellConfig indicates configuration information of a neighbor cell.
measCycleSCell Parameter: $T_{measure\_scc}$ is used when a secondary cell (SCell) operates at a frequency indicated in the measObject and is in a non-activated state.
measSubframeCellList is a list of cells to which the measSubframePatternNeigh is applied.
If a cell is not included in the measSubframeCellList, a time domain measurement resource restriction pattern for all neighbor cells is applied to the UE.
measSubframePatternNeigh is a time domain measurement resource restriction pattern applied in measuring RSRP and RSRQ of a neighbor cell on the carrier frequency indicated in the carrierFreq.

As described above, the MeasObjectEUTRA includes a configuration information of a neighbor cell (i.e., NeighCellConfig), a time domain measurement resource restriction pattern (i.e., measSubframePattern-Neigh) applied in measuring RSRP and RSRQ of the neighbor cell, and a cell list (i.e., measSubframeCellList) to which the pattern is applied.

Meanwhile, the UE 100 also receives a radio resource configuration information element (IE) as shown in the drawing.

The radio resource configuration dedicated IE is used to configure/modify/cancel radio bearers, to modify MAC configuration, etc. The radio resource configuration dedicated IE includes subframe pattern information. The subframe pattern information is information on a measurement resource restriction pattern on the time domain, for measuring RSRP and RSRQ of a primary cell (PCell).

The radio resource configuration dedicated IE includes fields as shown in the following table.

TABLE 6

- RadioResourceConfigDedicated
- measSubframePatternPCell-r10

The RadioResourceConfigDedicated field includes fields as shown in the following table.

TABLE 7

RadioResourceConfigDedicated field descriptions logicalChannelConfig is used as a selection for indicating that the logical channel configuration for SRBs is clearly signaled or that the logical channel configuration is set to a default logical channel configuration for SRB1.
logicalChannelIdentity is a logical channel identifier for identifying both uplink (UL) and downlink (DL)
mac-MainConfig is a selection used to indicate that the mac-MainConfig is clearly signaled or that the mac-MainConfig is set to default main configuration.
measSubframePatternPCell is a time domain measurement resource restriction pattern for measuring RSRP and RSRQ of a primary cell (PCell, i.e., serving cell).
physicalConfigDedicated is default dedicated physical configuration.

As described above, measSubframePatternPCell or measSubframePattern-Serv indicating the time domain measurement resource restriction pattern for measuring the RSRP and RSRQ of the primary cell (PCell, i.e., serving cell) is included in the RadioResourceConfigDedicated field within the RRC reconfiguration message.

<Carrier Aggregation (CA)>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

Carrier aggregation systems may be divided into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both a case where component carriers are contiguous and a case where component carriers are non-contiguous. Different numbers of component carriers may be aggregated for a downlink and an uplink. A case where the number of downlink component carriers and the number of uplink component carriers are the same is referred to as symmetric aggregation, and a case where the numbers are different is referred to as asymmetric aggregation.

When one or more component carriers are aggregated, component carriers to be aggregated may use the same bandwidths as adopted in an existing system for backward compatibility with the existing system. For example, the 3GPP LTE system supports bandwidths of 1.4 MHz, 3 MHz, 5 MHz, 10 MHz, 15 MHz, and 20 MHz, and the 3GPP LTE-A system may configure a broad band of 20 MHz or more only using the bandwidths of the 3GPP LTE system. Alternatively, instead of using the bandwidths of the existing system, new bandwidths may be defined to configure a broad band.

In order to transmit/receive packet data through a specific secondary cell in carrier aggregation, a UE first needs to complete configuration for the specific secondary cell. Here, configuration means that reception of system information necessary for data transmission/reception in a cell is completed. For example, configuration may include an overall process of receiving common physical-layer parameters necessary for data transmission and reception, media access control (MAC)-layer parameters, or parameters necessary for a specific operation in an RRC layer. A configuration-completed cell is in a state where packet transmission and reception is immediately possible upon receiving information indicating packet data may be transmitted.

A configuration-completed cell may be in an activated or deactivated state. Here, the activated state means that the cell performs data transmission or reception or is ready for data transmission or reception. A UE may monitor or receive a control channel (PDCCH) and a data channel (PDSCH) of an activated cell in order to identify resources (which may be a frequency or time) assigned thereto.

The deactivated state means that transmission or reception of traffic data is impossible and measurement or transmission/reception of minimal information is possible. A UE may receive system information (SI) necessary for receiving a packet from a deactivated cell. However, the UE does not monitor or receive a control channel (PDCCH) and data channel (PDSCH) of the deactivated cell in order to identify resources (which may be a frequency or time) assigned thereto.

<Introduction of Small Cell>

Meanwhile, in a next-generation mobile communication system, it is expected that a small cell having a small cell coverage radius is added in the coverage of a legacy cell and that the small cell handles a greater amount of traffic. The legacy cell has a greater coverage than that of the small cell, and thus is also referred to as a macro cell, which is described with reference to FIG. 8.

FIG. 8 illustrates a heterogeneous network environment in which a macro cell and a small cell coexist and which is possibly used in a next-generation wireless communication system.

FIG. 8 shows a heterogeneous network environment in which a macro cell of a legacy BS 200 overlaps with one or more small cells of small BSs 300a, 300b, 300c, and 300d. The legacy BS provides a greater coverage than the small BSs and thus is also referred to as a macro BS (macro eNodeB (MeNB)). In the present specification, the macro cell and the MeNB may be used together. A UE having access to the macro cell 200 may be referred to as a macro UE. The macro UE receives a downlink signal from the MeNB and transmits an uplink signal to the MeNB.

In this heterogeneous network, coverage holes of the macro cell may be filled by configuring the macro cell as a primary cell (Pcell) and by configuring the small cells as secondary cells (Scells). In addition, overall performance may be boosted by configuring the small cells as Pcells and by configuring the macro cell as a Scell <Introduction of 256 QAM>

In LTE/LTE-A, binary phase shift keying (BPSK), quadrature phase shift keying (QPSK), 16 quadrature amplitude modulation (QAM), and 64QAM are used as modulation schemes. However, in a next-generation communication system, the introduction of a small call leads to a decrease in communication distance, and accordingly the state of a radio channel is expected to become better. Thus, to optimize the efficiency of the radio channel, high-order modulation, for example, 256 QAM, may be used.

However, in order to support 256 QAM in a downlink while guaranteeing a high SINR, a BS is required to have a very low error vector magnitude (EVM) in transmission (Tx), for example, 3 to 4%.

$$EVM = \sqrt{\frac{P_{error}}{P_{avg,tx}}} \quad \text{[Equation 1]}$$

$P_{error}$ is power for an error vector, and $P_{avg,tx}$ is the average transmit power of a transmitting end. As a modulation order increases, the Euclidean distance between modulated symbols on a constellation decreases, and accordingly a system using a higher-order modulation in the same EVM may further deteriorate in performance A solution to prevent this situation may be maintaining a low EVM. However, maintaining a low EVM may complicate hardware implementation and may increase costs accordingly, thus being unsuitable.

Another solution is to reduce a transmit power range, thereby decreasing an error in a power amplifier of a transmitting end by non-linearity. Reducing transmit power is referred to as power backoff. This power backoff method may also be used for an existing transmitter and thus may be effective.

A medium-range BS generally has a transmit power of up to 38 dBm. By performing a power backoff of 14 dBm, the medium-range BS has a final transmit power of up to 24 dBm, and accordingly 256 QAM may be used. A transmit power of 24 dBm corresponds to the transmit power of a local-area BS.

Meanwhile, power backoff may be performed for each channel or for each subframe. However, performing power backoff for each individual channel causes a great increase in complexity, it may be efficient to perform power backoff for each subframe. Here, when power backoff is performed for each subframe, the power backoff is applied to not only a PDSCH but also a CRS.

However, when a CRS is transmitted on a power backoff-performed subframe, power for the CRS received on the subframe is small, and thus a UE may not perform accurate measurement. Further, the UE generally reports the average of results measured over a plurality of subframes to a BS; however, if a different power backoff is applied to each subframe as described above, it is inappropriate to report the average of results measured over the plurality of subframes.

Figure 9:
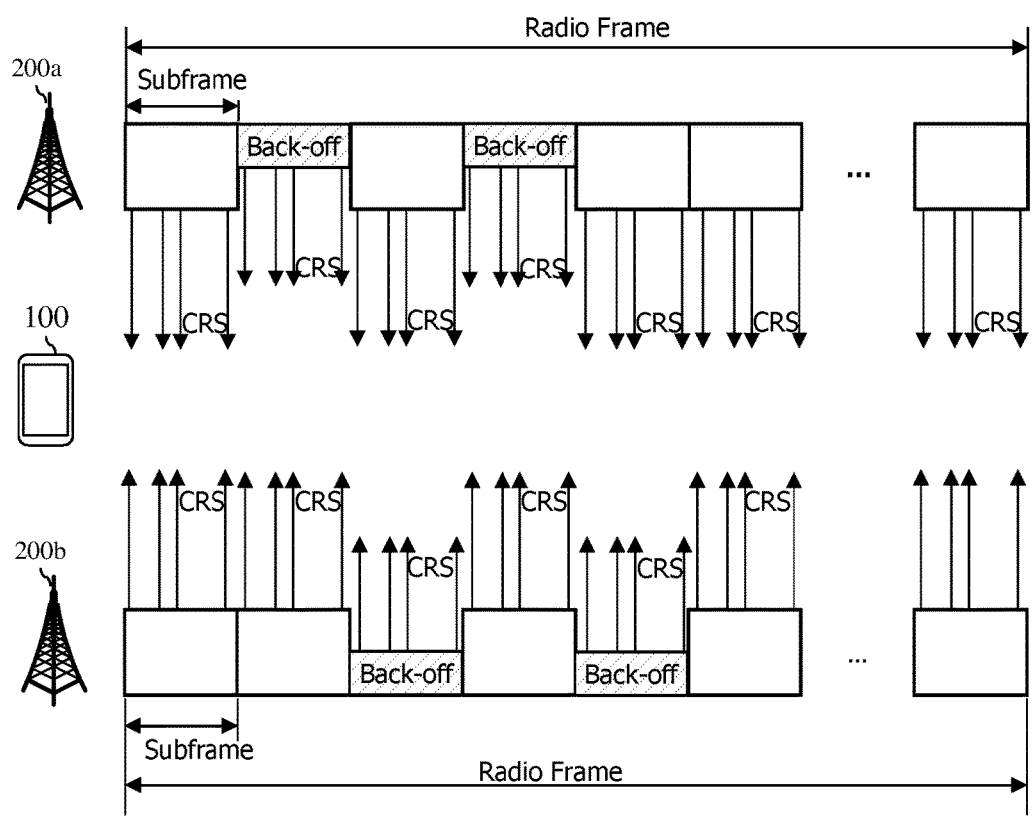
FIG. 9 illustrates a problem of CRS-based measurement in a case where power backoff is performed.

A detailed description is made with reference to FIG. 9.

FIG. 9 illustrates a problem of CRS-based measurement in a case where power backoff is performed.

As illustrated in FIG. 9, a first BS 200a and a second BS 200b perform power backoff on different subframes for the entire downlink channel.

Here, suppose that the first BS 200a applies a power backoff to the entire channel including a CRS and a PDSCH on second and fourth frames, while the second BS 200b applies a power backoff to the entire channel including a CRS and a PDSCH on third and fifth frames.

The receive power of a CRS received by a UE 100 on the second subframe on which the first BS 200a performs power backoff is measured smaller by the power backoff than a reference signal power for previous reception of the UE 100.

Therefore, results (for example, RSRP and RSRQ) measured by the UE 100 on the second and fourth subframes on which the first BS 200a performs power backoff are different by the level of the power backoff from results (for example, RSRP and RSRQ) measured by the UE 100 on subframes not subjected to power backoff.

For example, when the first BS 200a is a medium-range BS having a maximum transmit power of 38 dBm and applies a power backoff of 14 dB to the second and fourth subframes in order to apply 256 QAM, the UE 100 measures an at least 14 dB smaller receive power for the CRS on the second and fourth subframes.

When power backoff is applied to each subframe, a measured result for a CRS may significantly change in each subframe.

Furthermore, since the UE 100 reports the average of results measured on a certain number of subframes, power backoff leads to an overall undermeasurement.

<Solution in the Present Specification>

Accordingly, one disclosure of the present specification is intended to solve the foregoing problem. Specifically, one disclosure of the present invention proposes a method that enables a UE to independently perform measurement (for example, RSRP and RSRQ measurements) on a subframe subjected to power backoff and a subframe not subjected to power backoff. A detailed description is made with reference to FIG. 10.

Figure 10:
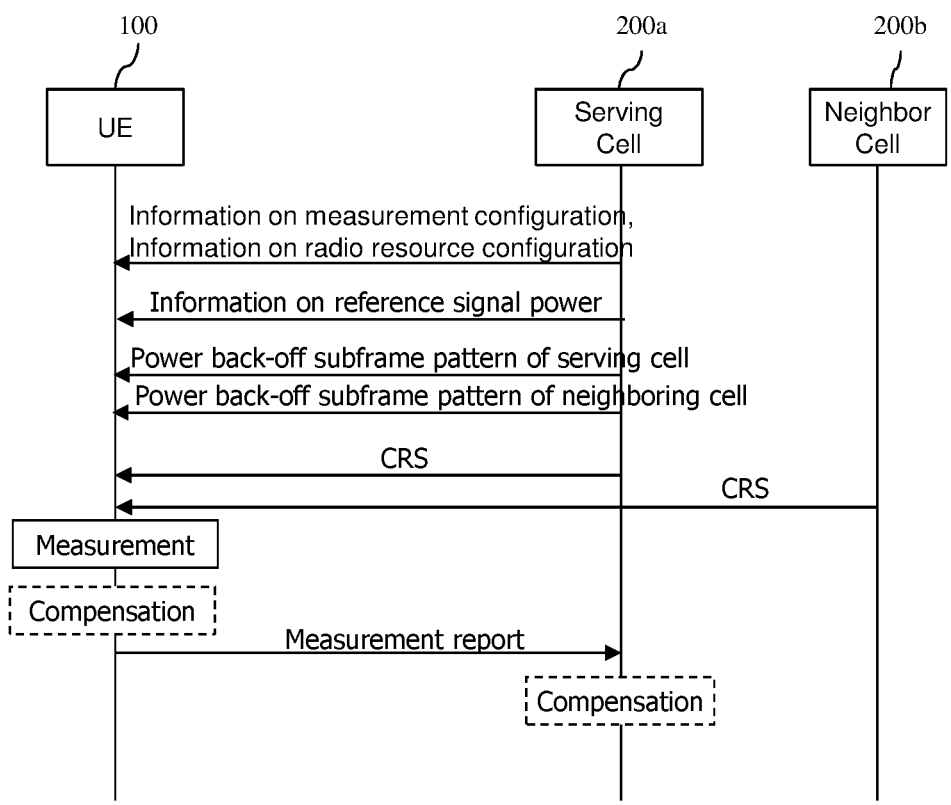
FIG. 10 illustrates a measurement procedure according to one disclosure of the present specification.

FIG. 10 illustrates a measurement procedure according to one disclosure of the present specification.

The procedure illustrated in FIG. 10 is mostly similar to the procedure illustrated in FIG. 7. The following description focuses on a distinctive procedure.

As illustrated in FIG. 10, a serving cell 200a transmits, to a UE 100, pattern information on a subframe on which the serving cell performs power backoff. Further, the serving cell 200a transmits, to the UE 100, pattern information on a subframe on which a neighboring cell performs power backoff. Here, when the subframe on which the serving cell performs power backoff is different from the subframe on which the neighboring cell performs power backoff, it is preferable that the subframe pattern information from the serving cell and the subframe pattern information from the neighboring cell are separately transmitted to the UE 100. However, when the subframe on which the serving cell performs power backoff is the same as the subframe on which the neighboring cell performs power backoff, only the subframe pattern information from the serving cell may be transmitted to the UE 100. Pattern information on a subframe on which power backoff is performed is 40 bits, indicating whether power backoff is performed for each of 40 subframes. For example, the pattern information on the subframe on which power backoff is performed may be expressed as 0010000110001000011000100001100010000110, which indicates power backoff is performed on third, eighth, and ninth subframes of each frame.

Meanwhile, the UE 100 independently performs measurement (RSRP and RSRQ measurements) on the subframe subjected to power backoff and on a subframe not subjected to power backoff based on the subframe pattern information from the serving cell 200a.

Likewise, the UE 100 independently performs measurement (RSRP and RSRQ measurements) on the subframe on which the neighboring cell performs power backoff and on a subframe on which the neighboring cell does not perform power backoff based on the subframe pattern information from the neighboring cell.

A result (for example, RSRP) measured on the subframes subjected to power backoff may be compensated for based on a power backoff value.

Such compensation may be performed by the UE 100 or by the serving cell.

For example, when the UE 100 performs the compensation, the UE 100 performs the compensation for a result (for example, RSRP) measured on the subframes subjected to power backoff according to a value based on information on power backoff of a corresponding cell. To this end, the UE 100 needs to receive, from the serving cell, the information on the power backoff of the corresponding cell (for example, power backoff value or a compensation value based on power backoff). However, once performing the compensation, the UE 100 may average a result measured on the subframe subjected to power backoff and a result measured on the subframe not subjected to power backoff and may report only an average measured result, achieving convenience.

When the serving cell 200a performs the compensation, the UE 100 needs to separately report a result measured on the subframe subjected to power backoff and a result measured on the subframe not subjected to power backoff to the serving cell. Here, the UE 100 may average only results measured on subframes subjected to power backoff and may report an average measured result. Likewise, the UE 100 may average only results measured on subframes not subjected to power backoff and may report an average measured result.

Then, the serving cell 200a performs compensation by adding a power backoff-based compensation value to the measured result (for example, RSRP value) on the subframe subjected to the power backoff. In this case, the serving cell 200a needs to also know a power backoff value of the neighboring cell in order to compensate for a measured result for the neighboring cell. This method is advantageous in that it is not necessary to transmit information on a power backoff value to the UE 100a.

Meanwhile, when a legacy UE, not an advanced UE according to the disclosure of the present specification, measures RSRP and RSRQ on a subframe subjected to power backoff, power backoff causes inaccurate measurement. Since the legacy UE is not provided with information on the subframe subjected to power backoff, the legacy UE averages a result measured on the subframe subjected to power backoff and a result measured on a subframe not subjected to power backoff and reports an average measured result (for example, RSRP and RSRQ).

To resolve this situation, the subframe subjected to power backoff is restricted to be correlated with the level of power backoff, thereby minimizing the impact of power backoff. Specifically, there may be proposed a method of reducing the ratio of subframes subjected to power backoff (that is, 256 QAM-applied subframes) with a greater power backoff value. For example, when a power backoff value is −14 dB, power backoff may be performed on only one of ten subframes. When a power backoff value is −6 dB, power backoff may be performed on only one of eight subframes. In both cases, averaging a result measured on a subframe subjected to power backoff and a result measured on a subframe not subjected to power backoff, an error caused by power backoff is 0.5 dB or smaller.

The aforementioned embodiments of the present invention can be implemented through various means. For example, the embodiments of the present invention can be implemented in hardware, firmware, software, combinations thereof, etc. Details thereof will be described with reference to the drawing.

Figure 11:
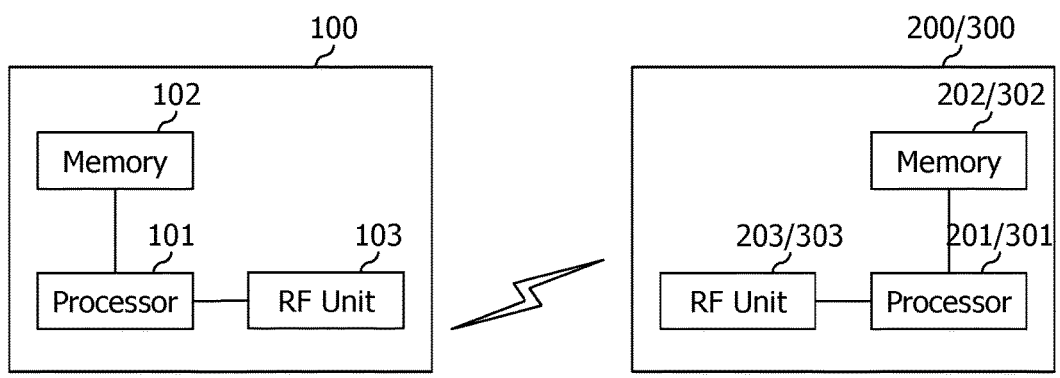
FIG. 11 is a block diagram of a wireless communication system according to a disclosure of the present specification.

FIG. 11 is a block diagram of a wireless communication system according to a disclosure of the present specification.

A BS 200/300 includes a processor 201/301, a memory 202/302, and a radio frequency (RF) unit 203/303. The memory 202/302 is coupled to the processor 201/301, and stores a variety of information for driving the processor 201/301. The RF unit 203/303 is coupled to the processor 201/301, and transmits and/or receives a radio signal. The processor 201/301 implements the proposed functions, procedures, and/or methods. In the aforementioned embodiment, an operation of the BS may be implemented by the processor 201/301

A UE 100 includes a processor 101, a memory 102, and an RF unit 103. The memory 102 is coupled to the processor 101, and stores a variety of information for driving the processor 101. The RF unit 103 is coupled to the processor 101, and transmits and/or receives a radio signal. The processor 101 implements the proposed functions, procedures, and/or methods.

The processor may include Application-specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing measurement, the method performed by a user equipment (UE) and comprising:

receiving, from a serving cell, a power backoff value of the serving cell and pattern information of the serving cell informing a plurality of subframes where power backoff is performed by the serving cell;

receiving, from the serving cell, a power backoff value of a neighboring cell and pattern information of the neighboring cell informing a plurality of subframes where power backoff is performed by the neighboring cell;

performing first measurement for the serving cell in the plurality of subframes, where the power backoff is performed by the serving cell, informed by the pattern information of the serving cell;

performing second measurement for the serving cell in at least one subframe other than the plurality of subframes informed by the pattern information of the serving cell;

compensating results of the first measurement for the serving cell, based on the power backoff value of the serving cell; and reporting, to the serving cell, the compensated results of the first measurement for the serving cell and results of the second measurement for the serving cell, wherein the results of the first measurement for the serving cell include under-measured values in view of results of the second measurement for the serving cell, wherein the plurality of subframes, informed by the pattern information of the serving cell, include scheduled data on a physical downlink shared channel (PDSCH), wherein the plurality of subframes, informed by the pattern information of the serving cell, are used for 256 quadrature amplitude modulation (QAM) by reducing a transmission power of the serving cell by the power backoff value, wherein the plurality of subframes, informed by the pattern information of the neighboring cell, include scheduled data on a physical downlink shared channel (PDSCH), and wherein the plurality of subframes, informed by the pattern information of the neighboring cell, are used for 256 QAM by reducing a transmission power of the neighboring cell by the power backoff value.

2. The method of claim 1, wherein reporting the compensated results of the first measurement for the serving cell and the results of the second measurement for the serving cell comprises reporting, to the serving cell, averaged results of the compensated results of the first measurement for the serving cell and the results of the second measurement for the serving cell.

3. The method of claim 1, wherein the pattern information of the serving cell is formed of 40 bits, and each bit of the 40 bits informs whether the power backoff is performed in a corresponding subframe.

4. A user equipment (UE) for performing measurement, the UE comprising:

a transceiver; and a processor operatively coupled to the transceiver, wherein the processor is configured to:

control the transceiver to receive, from a serving cell, a power backoff value of the serving cell and pattern information of the serving cell informing a plurality of subframes where power backoff is performed by the serving cell;

control the transceiver to receive, from the serving cell, a power backoff value of a neighboring cell and pattern information of the neighboring cell informing a plurality of subframes where power backoff is performed by the neighboring cell;

perform first measurement for the serving cell in the plurality of subframes, where the power backoff is performed by the serving cell, indicated by the pattern information of the serving cell;

perform second measurement for the serving cell in at least one subframe other than the plurality of subframes informed by the pattern information of the serving cell;

compensate results of the first measurement for the serving cell, based on the power backoff value of the serving cell; and control the transceiver to report, to the serving cell, the compensated results of the first measurement for the serving cell and results of the second measurement for the serving cell, wherein the results of the first measurement for the serving cell includes under-measured values in view of results of the second measurement for the serving cell, wherein the plurality of subframes, informed by the pattern information of the serving cell, include scheduled data on a physical downlink shared channel (PDSCH), wherein the plurality of subframes, informed by the pattern information of the serving cell, are used for 256 quadrature amplitude modulation (QAM) by reducing a transmission power of the serving cell by the power backoff value, wherein the plurality of subframes, informed by the pattern information of the neighboring cell, include scheduled data on a physical downlink shared channel (PDSCH), and wherein the plurality of subframes, informed by the pattern information of the neighboring cell, are used for 256 QAM by reducing a transmission power of the neighboring cell by the power backoff value.

5. The UE of claim 4, wherein the processor is further configured to:

report, to the serving cell, averaged results of the compensated results of the first measurement for the serving cell and the results of the second measurement for the serving cell.

6. The UE of claim 4, wherein the pattern information of the serving cell is formed of 40 bits, and each bit of the 40 bits informs whether the power backoff is performed in a corresponding subframe.

7. The method of claim 1, wherein the method further comprises:

performing first measurement for the neighboring cell in the plurality of subframes, where the power backoff is performed by the neighboring cell, informed by the pattern information of the neighboring cell; and performing second measurement for the neighboring cell in at least one subframe other than the plurality of subframes informed by the pattern information of the neighboring cell.

8. The UE of claim 4, wherein the processor is further configured to:

perform first measurement s for the neighboring cell in the plurality of subframes, where the power backoff is performed by the neighboring cell, informed by the pattern information of the neighboring cell; and perform second measurement for the neighboring cell in at least one subframe other than the plurality of subframes informed by the pattern information of the neighboring cell.

9. The method of claim 7, wherein the method further comprises:

compensating results of the first measurement for the neighboring cell, based on the power backoff value of the neighboring cell; and reporting, to the serving cell, the compensated results of the first measurement for the neighboring cell and results of the second measurement for the neighboring cell.

10. The UE of claim 8, wherein the processor is further configured to:

compensate results of the first measurement for the neighboring cell, based on the power backoff value of the neighboring cell; and control the transceiver to report, to the serving cell, the compensated results of the first measurement for the neighboring cell and results of the second measurement for the neighboring cell.

* * * * *